United States Patent
Levchenko et al.

(10) Patent No.: US 10,372,900 B2
(45) Date of Patent: Aug. 6, 2019

(54) SYSTEM AND METHOD FOR EXECUTING CALLS FROM OS PROCESS TO FILE SYSTEM

(71) Applicant: AO Kaspersky Lab, Moscow (RU)

(72) Inventors: Vyacheslav I. Levchenko, Moscow (RU); Andrey V. Sobko, Moscow (RU); Konstantin Y. Manurin, Moscow (RU); Vladimir V. Strogov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/040,055

(22) Filed: Feb. 10, 2016

(65) Prior Publication Data
US 2017/0177859 A1    Jun. 22, 2017

(30) Foreign Application Priority Data
Dec. 18, 2015    (RU) ................................ 2015154380

(51) Int. Cl.
G06F 21/51    (2013.01)
G06F 21/56    (2013.01)

(52) U.S. Cl.
CPC ............ *G06F 21/51* (2013.01); *G06F 21/561* (2013.01); *G06F 2221/033* (2013.01)

(58) Field of Classification Search
CPC ...... G06F 3/1263; G06F 9/5038; G06F 21/51; G06F 21/561; G06F 2221/033
See application file for complete search history.

(56) References Cited

U.S. PATENT DOCUMENTS

| | | | |
|---|---|---|---|
| 7,555,621 B1 * | 6/2009 | Pavlyushchik | G06F 3/0611 711/162 |
| 8,161,557 B2 | 4/2012 | Costea et al. | |
| 2005/0066095 A1 * | 3/2005 | Mullick | G06F 17/30171 710/200 |
| 2006/0037079 A1 * | 2/2006 | Midgley | G06F 21/56 726/24 |
| 2016/0210174 A1 * | 7/2016 | Hsieh | G06F 9/5038 |

* cited by examiner

*Primary Examiner* — Jeffrey D. Popham
(74) *Attorney, Agent, or Firm* — Arent Fox LLP; Michael Fainberg

(57) ABSTRACT

Disclosed are system and method for executing calls to a file system of a computer. An exemplary method comprises intercepting, by a software agent, a call to the file system; determining one or more parameters of the call that identify its functionality; determining a priority of executing the call based on the one or more parameters; storing information about the call, the parameters and the priority into a database; selecting from the database, one or more calls for execution based at least in part on relative priorities of execution of the plurality of calls stored in the database; determining whether to execute or not to execute a selected call based on whether the selected call interferes with execution of an earlier selected call; and when the selected call does not interfere with execution of an earlier selected call, passing the selected call to the file system for execution.

20 Claims, 3 Drawing Sheets

SYSTEM AND METHOD FOR EXECUTING CALLS FROM OS PROCESS TO FILE SYSTEM

The present disclosure claims benefit of priority under 35 U.S.C. 119(a)-(d) to a Russian Application No. 2015154380 filed Dec. 18, 2015, which is incorporated by reference herein.

FIELD OF TECHNOLOGY

The present invention relates generally to the field of computer security and, more specifically to systems and methods for executing calls from operating system (OS) processes to the file system during the scanning of the file system by an antivirus application.

BACKGROUND

The rapid development of computer and information technologies in the recent decade has led to their massive use on both the consumer and the corporate market. The universal presence of electronic document, e-commerce services, cloud storage and other computer technologies has become widespread. It has become very common to store personal and confidential information on computers, and an overwhelming majority of enterprises are conducting their financial and commercial activity using electronic devices and services.

The massive use of information technologies has led to the growth of fraud with the use of these technologies—an enormous number of malicious programs have appeared, and the number of cyber attacks on computer systems has substantially increased. To protect computer systems against cyber attacks and malware, many different security technologies have been developed, such as antivirus programs, firewalls, and other, which are able to both detect known and unknown malicious programs and remove them from users' devices.

The continual growth in the number of malicious programs and the increasing complexity of their structure and behavior demand constant perfecting of the antivirus technologies. However, ever-increasing volumes of antivirus libraries and complexity of heuristic and proactive algorithms for detecting malicious programs have a negative impact on the operation of computers on which these antivirus application execute. Particularly detrimental may be "needless scans" performed by antivirus applications (e.g., situations where the scan should be aborted because the results of the scan will never be used by the antivirus application or the user) and desynchronization of data being scanned by an antivirus application and data modified by other applications executing on the computer.

SUMMARY

Disclosed are system and method for executing calls from operating system processes to the file system during the scanning of the file system by an antivirus application. The disclosed system and methods improve efficiency of antivirus applications in accessing resource of the file system and minimize cases of needless scans and data desynchronization.

An exemplary method comprises: intercepting, by a software agent of the antivirus application, a call to the file system; determining one or more parameters of the call that identify its functionality; determining a priority of executing the call based on the one or more parameters; storing information about the call, the parameters and the priority into a database; selecting from the database, one or more calls for execution based at least in part on relative priorities of execution of the plurality of calls stored in the database; determining whether to execute or not to execute a selected call based on whether the selected call interferes with execution of an earlier selected call; and when the selected call does not interfere with execution of an earlier selected call, passing the selected call to the file system for execution.

In one exemplary aspect, intercepting, by the software agent, a call to the file system includes intercepting a call from a process of an antivirus application to the file system.

In one exemplary aspect, the software agent includes a driver configured to detect calls to the file system and modify the detected calls to be redirected to the driver.

In one exemplary aspect, the one or more parameters may include: identifier of the process that made the call, type of the call, identifier of a file called in call, attributes of the file, parameters of the data contained in the file, and security policies for accessing the file.

In one exemplary aspect, selecting from the database, one or more calls for execution based at least in part on relative priorities of execution of the plurality of calls stored in the database includes one or more of: selecting a call with a specified priority; selecting a call with the higher priority over all other calls in the database; selecting a call having lower priority than a call that was sent for execution earlier; selecting a call having higher priority than a call that was sent for execution earlier; and selecting two or more calls having the same priority of execution provided that the total number of such calls exceeds a threshold.

In one exemplary aspect, determining whether to execute a selected call based on whether the selected call interferes with execution of an earlier selected call includes: determining whether the selected call has at least one parameter in common with an earlier selected call that still being executed.

An exemplary system for executing calls to a file system of a computer includes a hardware processor configured to: execute a software agent operable to intercept a call to the file system; determine one or more parameters of the call that identify functionality of the call; determine a priority of executing the call based on the one or more parameters; store information about the call, the parameters and the priority to a database; select from the database, one or more calls for execution based at least in part on relative priorities of execution of the plurality of calls stored in the database; determine whether to execute or not to execute a selected call based on whether the selected call interferes with execution of an earlier selected call; and when the selected call does not interfere with execution of an earlier selected call, pass the selected call to the file system for execution.

An exemplary non-transitory computer readable medium storing computer executable instructions for executing calls to a file system of a computer, includes instructions for: intercepting, by a software agent executed by a processor, a call to the file system; determining one or more parameters of the call that identify functionality of the call; determining a priority of executing the call based on the one or more parameters; storing information about the call, the parameters and the priority to a database; selecting from the database, one or more calls for execution based at least in part on relative priorities of execution of the plurality of calls stored in the database; determining whether to execute or not to execute a selected call based on whether the selected call interferes with execution of an earlier selected call; and when the selected call does not interfere with execution of an earlier selected call, passing the selected call to the file system for execution.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS

Example aspects of the present invention are described herein in the context of a system, method, and computer program product for executing calls from operating system processes to the file system during the scanning of the file system by an antivirus application. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
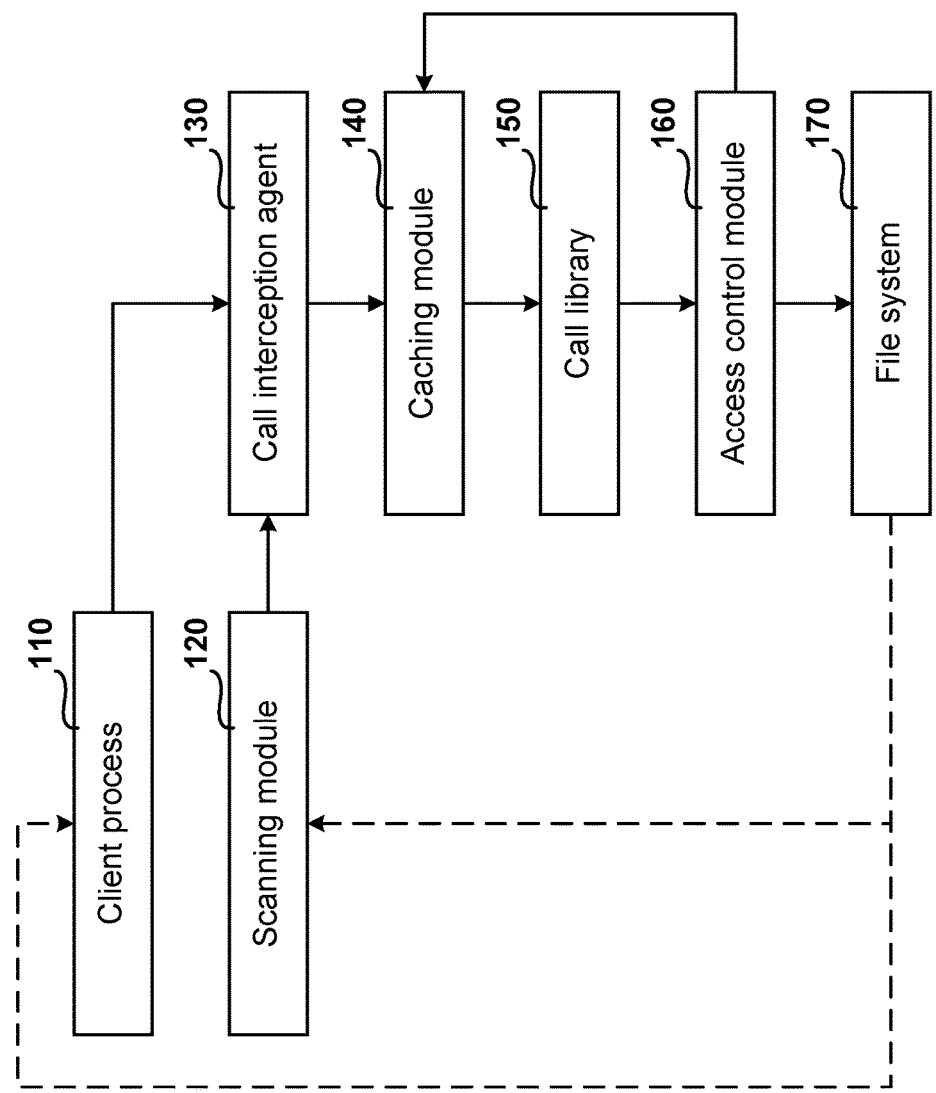
FIG. 1 shows a structural diagram of an exemplary aspect of a system for execution of calls from operating system processes to the file system.

FIG. 1 shows a structural diagram of an exemplary aspect of a system for execution of calls from operating system processes to the file system. The system includes a client process 110, a scanning module 120, a call interception agent 130, a caching module 140, a call library 150, an access control module 160 and a file system 170.

The client process 110 is configured to transmit calls to the file system 170 for execution of actions on files (such as creating and deleting files, reading data from files and writing of data to a file, changing file attributes, and so on) and obtaining the results of these actions from the file system 170. The client can include, but not limited to: applications working in the operating system, and modules of the operating system such as a file manager, memory manager, etc.

In various exemplary aspects, the calls to the file system 170 can be either calls to individual API functions or sequences of calls to API functions. For example, in the operating system of the Windows family the call to delete a file "c:\document.txt" will be formulated:
    DeleteFile("c:\\document.txt");
and to write 10 KB of data to the file "c:\windows\info.log" the sequence of calls will be formulated:
    HANDLE FileHandle=CreateFile(L"c:\\windows\\info.log", GENERIC_WRITE, FILE_SHARE_READ, NULL, CREATE_ALWAYS, FILE_ATTRIBUTE_NORMAL, NULL);
    WriteFile(FileHandle, Log Buffer, 0x00002800, NULL);
    CloseHandle(FileHandle);

In one exemplary aspect, the scanning module 120 is configured to transfer high-priority calls to the file system 170 to execute actions on files and obtain the results of these actions from the file system 170. The scanning module 120 can include, but not limited to: antivirus applications, and programs to restore the operability of the operating system after the operability of the operating system has been influenced by malicious programs.

For example, for an effective working of an antivirus application (i.e., to scan files and find malicious programs) it is necessary for calls from processes of the antivirus application to the file system to be processed as much as possible before calls from other processes (which may also include a malicious process).

The high-priority call send by the process of the scanning module 120 is a call which is to be executed by the file system 170 before all calls transmitted by the client processes 110.

In one exemplary aspect, the call interception agent 130 is configured to: intercept calls from a client process 110 and a process of the scanning means 120 to the file system 170 for execution of actions with files; and transfer the intercepted calls to the caching module 140. In one exemplary aspect, the call interception agent 130, intercepting calls being sent by the client process 110 or the process of the scanning module 120 to the file system 170, can be a driver specially developed for this purpose, whose operation involves redirecting the call transmission channel (for example, changing the address of the source receiving the calls) from the file system 170 to itself. Thus, the call being sent by the process 110 or 120 is received by the driver, and not by the file system 170.

In one exemplary aspect, the caching module 140 is configured to: identify parameters of each intercepted call and determine the execution priority of each call by matching parameters of the call with those of calls stored in a call library, where said execution priority of the call corresponds to a call having at least one identical parameter. The priority of call execution characterizes the probability of sending said call by the access control module 160 to the file system 170 for execution. The probability of sending the call being the chance of successful execution of the call sent by the control module 160 to the file system 170, i.e., the chance that the execution of the call sent does not interfere with the execution of the calls previously sent by the control module 160 to the file system 170 and still being executed at the moment of sending the aforementioned call. For example, a call to delete a rarely used file has a high priority of execution, since the chance that the deletion of that file interferes with the execution of another previously sent call is slight. The caching module 140 then adds to the call library the call itself, its parameters and the information about priority of execution of the call.

In one exemplary aspect, the parameters of the call may include sets of data determining the functionality of the call being executed by the file system 170. For example, a call to read data from a file, which call is sent to the file system 170 by a process of the "Notepad" application, being a consecutive call for the WinAPI functions:

HANDLE FileHandle=CreateFile(L"c:\\document.exe", GENERIC_READ, FILE_SHARE_READ, NULL, OPEN_EXISTING, FILE_ATTRIBUTE_NORMAL, NULL);
SetFilePointer(FileHandle, 0x00008020, NULL, FILE_BEGIN);
ReadFile(FileHandle, ReadBuffer, BufferSize, NULL);
CloseHandle(FileHandle);

where the set of data being sent to the function "CreateFile" is a parameter identifying the file with which work will be done, and the set of data being sent to the functions "SetFilePointer" and "ReadFile" is a parameter identifying the type of operation and the data required.

In various exemplary aspects, the call parameters may include, but not limited to: an identifier of the process which sent the call for execution to the file system 170 (e.g., the process handle or the global unique identifier (GUID) of the process); a call type, characterizing which operations are to be executed on the file (e.g., deletion or creation of the file, reading data from the file or writing data to the file, etc.); a file identifier (e.g., the complete path to the file, the global unique file identifier (GUID), the file handle, etc.); file attributes; parameters of the data being written to the file or read from the file (e.g., a pointer to data in memory, the volume of the data, etc.); and security policies for accessing and working with the file.

In one exemplary aspect, the priority for execution of the call received by the caching module 140 may be equal to the execution priority of the call stored in the call library 150, in the case when said execution priority of the call corresponds to the call also being stored in the call library 150, at least one call parameter of which is equal to at least one parameter identified from the call received by the caching module 140. In another exemplary aspect, the priority for execution of the call received by the caching module 140 may be equal to the maximum possible execution priority of the call in the event that the call was received from a process of the scanning module 120. In yet another exemplary aspect, the priority for execution of the call received by the caching module 140 may be lower than the execution priority of a call stored in the call library 150 in the case when said execution priority of calls corresponds to a call which is also being stored in the call library 150, no call parameter of which is equal to any parameter singled out from the call received by the caching module 140.

For example, the caching module 140 has received from the client process 110, being the "Windows Explorer" application, a call to delete the file "c:\document.exe":
DeleteFile("c:\\document.txt").
The call parameters that are identified in the received call are: type of operation on the file: "deletion", and file identifier: "c:\document.txt".

From the call library 150 a call may be selected in which one of the call parameters—the type of operation on the file—is the same as that of the call received by the caching module 140—"deletion". As a result, the calls are considered to be similar, and therefore the execution priority of the call received by the caching module 140 may be computed as follows:

$P_{dst}=P_{src}-1$ where $P_{dst}$ is the execution priority of the call received by the caching module 140, $P_{src}$ is the execution priority of the call selected from the call library 150.

In another case, when the parameters of the call received by the caching module 140 and that selected from the call library 150 are identical, for example; in the case of the calls:
Notepad application→DeleteFile("c:\\document.txt");
Windows Explorer application→DeleteFile("c:\\document.txt");
the execution priority of the call received by the caching module 140 is equal to the execution priority of the call selected from the call library 150.

In one exemplary aspect, the call library 150 is configured to store calls received from the caching means 140, the parameters of the calls being stored and the execution priorities by the file system 170 of the calls being stored. The call library 150 is configured to send the data being stored to the access control module 160 when requested.

In the call library 150, calls, call parameters and call execution priorities can be combined into call data blocks and stored in the call library 150 in the form of a set of call data blocks, where each call data block includes one call, the parameters of this call, and the execution priority of this call. Moreover, data blocks of calls including identical call execution priorities can also be combined into sets of call data blocks including the call execution priority and call data blocks which in turn include the calls and the call parameters.

In one exemplary aspect, the access control module 160 is configured to select from the call library 150 calls and parameters of the selected calls on the basis of a comparison of the execution priorities of the calls from the call library 150 and the execution priority of the call previously sent by the access control module 160 to the file system 170 for execution; and to make a decision on the execution of the selected calls on the basis of a comparison of the parameters of the selected calls with the parameters of the call previously sent for execution to the file system 170.

The access control module 160 may make a negative decision in the event that the execution of the call interferes with the execution of calls previously sent for execution to the file system 170 and being executed at the moment of the start of execution of the call for which the aforementioned decision was made (for example, write to file may affect the results of read from file, occurring at the same time as the writing to that same file).

The access control module 160 may make an affirmative decision in the case when the execution of the call does not interfere with the execution of calls previously sent for execution to the file system 170 and being executed at the moment of the start of execution of the call for which the aforementioned decision was made (for example, read from file does not affect the results of reading from this same file).

In one exemplary aspect, depending on the decision made, the access control module 160 may send the selected calls to the caching means 140, in the case of a negative decision, or to the file system 170 for execution of the selected call, in the case of an affirmative decision.

The access control module 160 selects from the call library 150 the calls and parameters of the selected calls corresponding to: call execution priorities lower than the execution priority of a call previously sent for execution; and call execution priorities also corresponding to calls from the call library 150, the number of such calls being larger than the number of calls corresponding to the execution priority of a call previously sent for execution.

For example, access control module 160 may select from the call library 150: a call with the highest call priority out of all the calls being stored in the call library 150; calls with identical call priorities, provided that the number of such calls is above an established limit; a call with an established call priority (such as 0x00000000 or 0xFFFFFFFF). The selected data can be removed from the call library 150, or the lowest possible priority (such as 0x00000000) is given to the execution priorities of the calls selected from the call library 150.

In one exemplary aspect, the access control module 160 after selection of the call from the call library 150 removes the selected call from the call library.

In one exemplary aspect, the access control module 160 stores in its memory the call parameters and the execution priority of the call for later selection of calls from the call library 150.

In this case, the access control module 160 makes: a negative decision for the execution of the calls selected from the call library 150 in the event that each parameter of the selected calls is equal to one of the parameters of the call previously sent for execution to the file system 170; or an affirmative decision to execute the processes selected from the call library 150 in the case when no parameter of the selected calls is equal to any parameter of the call previously sent for execution to the file system 170.

In the case, when the call selected from the call library 150 interferes with the working of the call previously sent for execution to the file system 170, but such that the result of this call will not be used afterwards, the call selected from the call library may be executed. For example, in the case when, during the execution of a call for reading of data from a file by an antivirus application for scanning the file for malicious content, a call arrives from an application (such as "Windows Explorer") to delete the file being scanned, such a call may be executed, and the file will be deleted even before the antivirus application finishes the scanning of the file for malicious content, since the result of the read operation from that file has no effect at all, because the file will no longer exist in the file system 170.

In one exemplary aspect, the access control module 160 selects calls from the call library 150 according to the follow criteria: the execution priority of the call being selected is higher than the execution priority of a call previously sent by the access control module 160 to the file system 170 for execution; or the number of calls being stored in the call library 150 and having a priority of call execution equal to the execution priority of the call being selected is greater than the number of calls being stored in the call library 150 and having a priority of call execution equal to the execution priority of a call previously sent by the access control module 160 to the file system 170 for execution.

Let's consider the working of a system for execution of calls from operating system processes to a file system using the example of the working of a file archiver, which is a program for compression of data from files in an OS being scanned by an antivirus application.

The user, using the file archiver, is going to create an archive of files from the directory "c:\documents", and delete the files themselves after successful archiving. At the same time as the archiving, the indicated directory is scanned on schedule by the antivirus application.

The file archiver process responsible for the file archiving, being a client process 110, addresses the file system 170 with a call to read the file "c:\documents\document001.txt":

HANDLE FileHandle=CreateFile(L"c:\\documents\\document001.txt", GENERIC_READ, FILE_SHARE_READ, NULL, OPEN_EXISTING, FILE_ATTRIBUTE_NORMAL, NULL);
    ReadFile(FileHandle, FileBuffer, FileSize, NULL);
    CloseHandle(FileHandle);

and with a subsequent call to delete the file c:\documents\document001.txt:

DeleteFile(L"c:\\documents\\document001.txt");

At the same time as this, the process of an antivirus application responsible for finding malicious programs, being a process of the scanning module 120, addresses the file system 170 with a call to read data from the file "c:\documents\document001.txt", for a subsequent scanning for malicious content:

HANDLE FileHandle=CreateFile(L"c:\\documents\\document001.txt", GENERIC_READ, FILE_SHARE_READ, NULL, OPEN_EXISTING, FILE_ATTRIBUTE_NORMAL, NULL);
    SetFilePointer(FileHandle, 0x0000FFFF, NULL, FILE_BEGIN);
    ReadFile(FileHandle, ScanBuffer, 0x00001000, NULL);
    CloseHandle(FileHandle);

The call interception agent 130 intercepts the call to read data from the file from the process of the scanning module 120 to the file system 170 and transmits it to the caching module 140. The caching module 140 identifies the call parameters from the received call for reading of data from the file, namely: type of operation on the file: "reading", file identifier: "c:\documents\document001.txt", and operation parameters: position in the file from which data must be read: 0x0000FFFF, and volume of data being read: 0x00001000.

Since the call is high-priority, as it was received from a process of the scanning module 120, the execution priority of this call is set at the maximum: 0xFFFFFFFF. Moreover, a search is made in the call library 150 for calls with similar call parameters in order to combine the calls found into a single set of call data blocks which will be assigned a maximum priority found, i.e., in the present case: 0xFFFFFFFF. Thus, if there existed in the call library 150 yet another call with the same parameters as those of the call received from the process of the scanning module 120, but received from a client process 110 (such as the "Notepad" application) and having a lower call execution priority equal to 0x00000010, the execution priority of that call will be raised to 0xFFFFFFFF and the call will be sent for execution to the file system 170 at the same time as the call received from the process of the scanning module 120. After the call parameters and the execution priority of the call received from the process of the scanning module 120 have been determined, they together with the call, having been combined into a call data block, are entered in the call library 150 storing call data blocks, where each call data block contains the call itself, its call parameters, and the call execution priority.

The call intercept module 130 intercepts the calls for reading of data from a file and for deletion of a file from a client process 110, being the file archiver, to the file system 170 and sends these to the caching module 140. The caching module 140 identifies the parameters from the received calls for reading of data from a file and for deletion of a file, namely: for the call to read data from a file: type of operation on the file: "reading", file identifier: "c:\documents\document001.txt", operation parameters: position in the file from which data must be read: 0x00000000 and volume of data being read: <file size>; for the file deletion call: type of operation on the file: deletion, and file identifier: "c:\documents\document001.txt".

After this, the caching module 140 performs a search in the call library 150 for calls having the same parameters as in the calls received (type of operation on the file, file identifier and so on). As a result of the search in the call library 150 a call is found from the "Notepad" application for reading of the content of the file "c:\documents\document001.txt". After the successful search, the caching module 140 determines the execution priority of the call to read from the file "c:\documents\document001.txt". Since yet another read call was found in the call library 150, the received read call is given a priority of call execution lower by one than the execution priority of the read call of the file "c:\documents\document001.txt" from "Notepad" (priorities of call execution $P_{read\#1}$=217 and $P_{read\#2}$=216 respectively). Similar actions are performed for the call for deletion of the file "c:\documents\document001.txt": a search is made for a call with similar call parameters in the call library 150. Since no call to delete the file "c:\documents\document001.txt" was found in the call library 150, said call receives the lowest execution priority out of all the calls being stored in the call library 150 (call execution priority $P_{delete\#1}$=7). After the caching module 140 has received the call execution priorities, the received calls and their execution priorities are entered by the caching module 140 in the call library 150.

The access control module 160 makes a selection from the call library 150 of a call data block containing the call itself, the call parameters and the execution priority of the call, in which the execution priority of the call is the highest out of all the call execution priorities being stored in the call library 150. This call execution priority is a call execution priority equal to 0xFFFFFFFF, corresponding to the call received from an antivirus application, which application is a process of the scanning module 120. The call is dispatched for execution to the file system 170, while the call parameters and the execution priority of the call are saved for participation in the later selection of calls from the call library 150.

After this, the access control module 160 makes a selection from the call library 150 of the next call data block. Taking into account the previous call dispatched for execution to the file system 170, there are two calls for reading the file "c:\documents\document001.txt", received from a process of an antivirus application and a process of the "Notepad" application. The access control module 160 checks whether it is possible to execute these calls. For this purpose, it determines whether a call with a higher execution priority is at present being executed by the file system 170 on the file "c:\documents\document001.txt". It turns out that a call from an antivirus application, being a process of the scanning module 120, is still being executed by the file system 170. Accordingly, the access control module 160 verifies the type of call operation for the calls selected from the call library 150 (the call received from the antivirus application and the call received from the "Notepad" application), and for the high-priority call currently being executed. Since in both cases this is a file reading operation, which means it does not affect the result of the high-priority call currently being executed, an affirmative decision is made for the execution by the file system 170 of the calls selected from the call library 150, after which the call data blocks containing said call are removed from the call library 150, and the calls themselves are sent to the file system 170 for execution.

The next call data block selected from the call library 150 by the access control module 160 contains a call from a file archiver, being a client process 110, for deletion of the file "c:\documents\document001.txt". The access control module 160 determines whether it is possible to execute this call. For this purpose, it determines whether a call with a higher execution priority is at present being executed by the file system 170 on the file "c:\documents\document001.txt". It turns out that a call from the antivirus application, being a process of the scanning module 120, is still being executed by the file system, that is, the operation of deletion of the file "c:\documents\document001.txt" may interfere with its execution, so a negative decision is made for the execution by the file system 170 of the call received from the antivirus application 120, after which the call itself will be sent to the caching module 140 for reprocessing, i.e., singling out of call parameters, determination of the execution priority of the call, and entering of the obtained data in the call library 150.

Therefore, the client processes 110 sending calls to the file system 170 does not affect the operating ability of the calls being sent by the processes of the scanning module 120, and the client processes 110 sending calls to the file system 170 can be combined into sets of call data blocks, in the event of identical call parameters, and be sent for execution at the same time to the file system 170.

Figure 2:
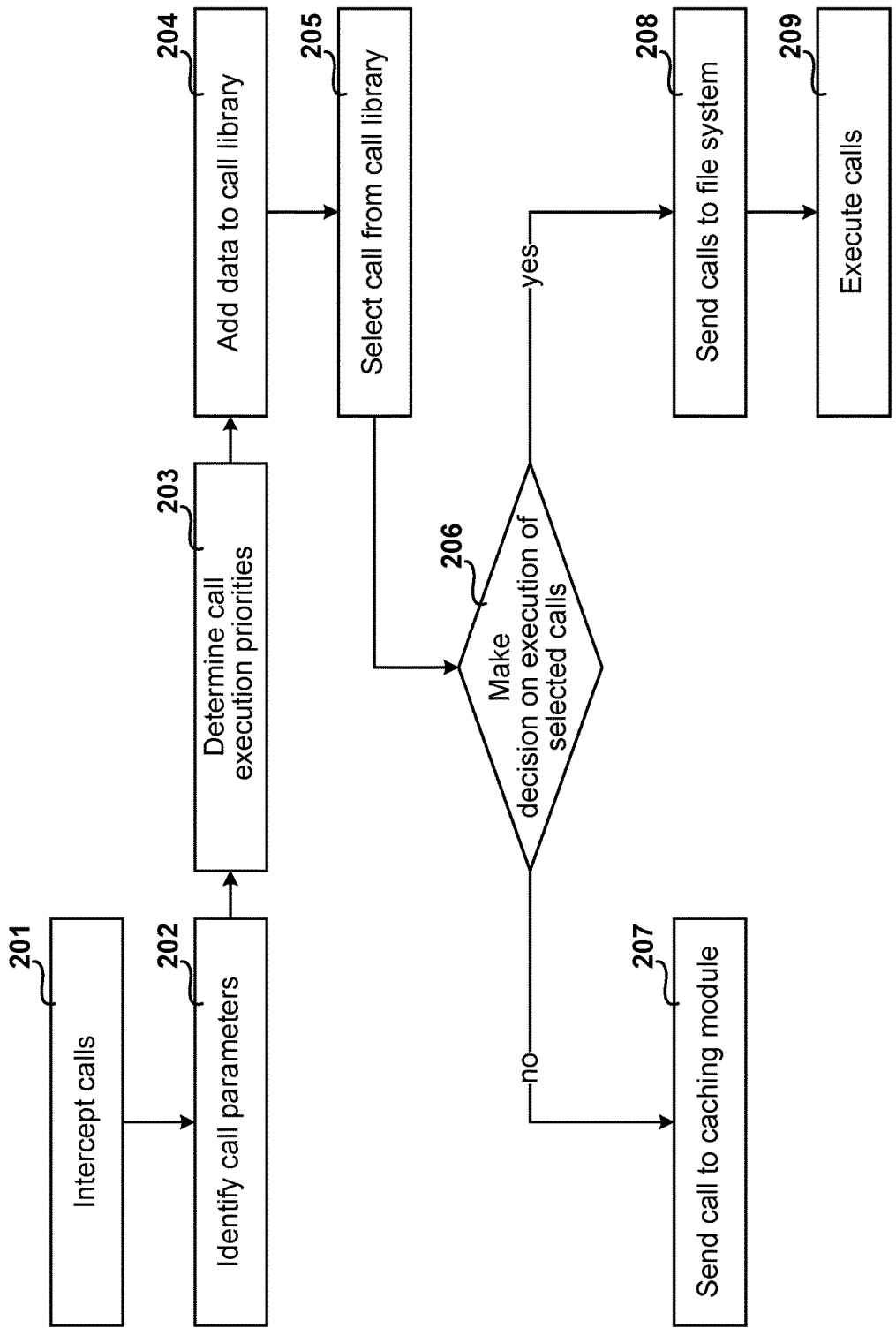
FIG. 2 shows a flow diagram of a exemplary aspect of a method for execution of calls from operating system processes to the file system.

FIG. 2 shows an example of a flow diagram of an exemplary aspect of a method of execution of calls from operating system processes to the file system. In step 201, calls to the file system 170 from the client process 110 or from the process of the scanning module 120 are intercepted by the call intercept module 130. The call interception agent 120 may be provided by the client process 110 or the process of the scanning module 120 to the file system 170 can be a driver specially developed for this purpose, whose working involves redirecting the call transmission channel (for example, changing the address of the source receiving the calls) from the file system 170 to itself. Thus, the call being sent by the process 110 or 120 is received by the driver, and not by the file system 170.

In step 202, call parameters are identified from the intercepted calls by the caching module 140. The call parameters in this case may be sets of data determining the functionality of the call being executed by the file system 170. The call parameters may include, but not limited to: an identifier of the process which sent the call for execution to the file system 170, for example, the process handle or the global unique identifier (GUID) of the process; a call type, characterizing which operations are to be executed on the file (such as deletion or creation of the file, reading data from the file or writing data to the file, and so on); a file identifier (such as the complete path to the file, the global unique file identifier (GUID), the file handle, and so on); file attributes; parameters of the data being written to the file or read from the file (such as a pointer to data in memory, the volume of the data, and so on); and security policies for accessing or working with the file.

For example, from a call to create a file, sent to the file system 170 by a process of the "Microsoft Word" application, being a call of the WinAPI functions
  HANDLE FileHandle=CreateFile(L"c:\\text.docx", GENERIC_WRITE, 0, NULL, CREATE_ALWAYS, FILE_ATTRIBUTE_NORMAL, NULL);
the following call parameters will be identified: the process identifier: Microsoft Word (PID=0x00006020); the file identifier: "c:\text.docx"; the type of operation: "create file"; the file attributes: FILE_ATTRIBUTE_NORMAL; and the security policies: only a write operation for the Microsoft Word process is allowed (PID=0x00006020), and/or no other operations with the indicated file are allowed for all other processes of the operating system.

In step 203, the execution priorities of the calls are determined. The priority for execution of the call can be: equal to the execution priority of the call stored in the call library 150, in the case when said execution priority of the call corresponds to a call also being stored in the call library 150, at least one call parameter of which is equal to at least one parameter identified in step 202; equal to the maximum possible execution priority of the call in the event that the call intercepted in step 201 was intercepted from a process of the scanning module 120; or lower than the execution priority of a call stored in the call library 150 in the case when said execution priority of calls corresponds to a call which is also being stored in the call library 150, no call parameter of which is equal to any parameter identified in step 202.

In step 204, the caching module 140 adds to the call library 150 the call itself, the call parameters, and the call execution priority. Before being added to the call library 150, the calls intercepted in step 201, the call parameters identified in step 202, and the call execution priorities calculated in step 203 can be combined into call data blocks, which will also be stored in the call library 150 in the form of a set of call data blocks, where each call data block includes one call, the parameters of this call, and the execution priority of this call. Moreover, call data blocks including identical call execution priorities can also be combined into sets of call data blocks including the call execution priority and call data blocks which in turn include calls and call parameters.

In step 205, the access control module 160 selects calls from the call library 150. In this process, calls and parameters of the selected calls are selected from the call library 150, said calls and parameters having corresponding: call execution priorities lower than the execution priority of a call previously sent for execution; and/or call execution priorities also corresponding to calls from the call library 150, the number of such calls being larger than the number of calls corresponding to the execution priority of a call previously sent for execution.

For example, there may be selected from the call library 150: a call with the highest call priority out of all the calls being stored in the call library 150; calls with identical call priorities, provided that the number of such calls is above an established limit; or a call with an established call priority (such as 0x00000000 or 0xFFFFFFFF). The data so selected can be: removed from the call library 150; and/or the lowest possible priority (such as 0x00000000) is given to the execution priorities of the calls selected from the data library 150.

In another exemplary aspect, at step 205, the access control module 160 may select calls from the call library 150 according to the following criteria: the execution priority of the call being selected is higher than the execution priority of a call previously sent by the access control means 160 to the file system 170 for execution; and/or the number of calls being stored in the call library 150 and having a priority of call execution equal to the execution priority of the call being selected is greater than the number of calls being stored in the call library 150 and having a priority of call execution equal to the execution priority of a call previously sent by the access control means 160 to the file system 170 for execution.

In step 206, the access control module 160 makes a decision whether to execute the selected calls. A negative decision will be made in the event that the execution of the call interferes with execution of calls previously sent for execution to the file system 170 and being executed at the moment of the start of execution of the call for which the aforementioned decision is made (for example, write to file may influence the results of reading from file, occurring at the same time as the writing to this same file). For example, a negative decision on the execution of calls selected from the call library 150 is made when each parameter of the calls selected in step 205 is equal to one of the parameters of a call previously sent.

An affirmative decision may be made in the case when the execution of the call does not interfere with the execution of calls previously sent for execution to the file system 170 and being executed at the moment of the start of execution of the call for which the aforementioned decision was made (for example, read from file does not affect the results of reading from this same file). For example, an affirmative decision on the execution of calls selected from the call library 150 is made in the case when no parameter of the calls selected in step 205 is equal to any parameter of a call previously sent.

In step 207, the access control module 160 sends the calls to the caching module 140 in the event of a negative decision having been made as to the execution of the calls in step 206.

In step 208, the access control module 160 sends the calls to the file system 170 in the event of an affirmative decision having been made as to the execution of the calls in step 206.

In step 209, the file system 170 executes the received call.

Figure 3:
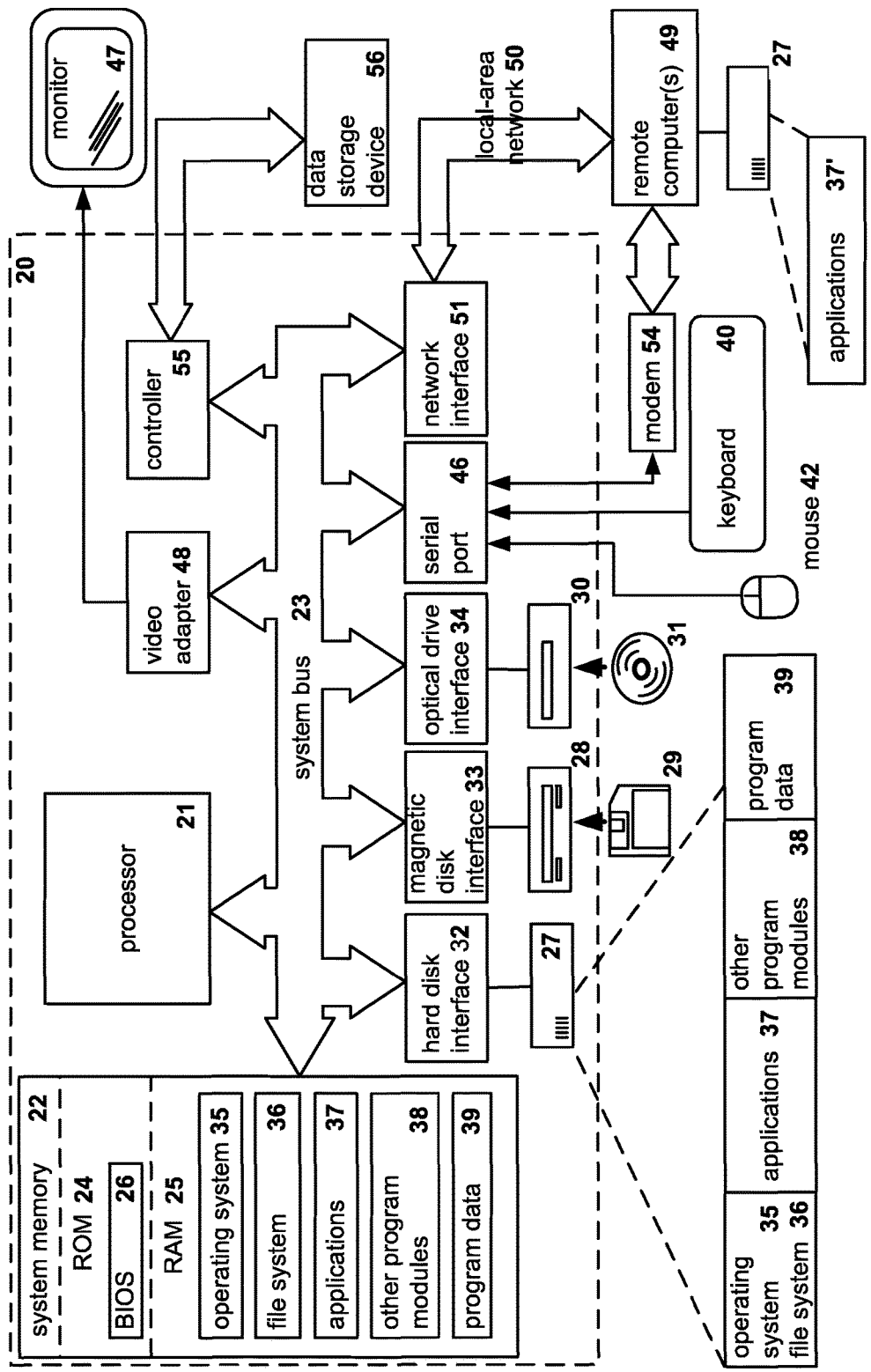
FIG. 3 shows an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are effectiveness-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for executing calls to a file system of a computer, the method comprising:
   intercepting, by a software agent executed by a processor, a first call to the file system;
   determining two or more parameters of the first call that identify at least one functionality of the call, the two or more parameters comprising a first call parameter specifying a type of operation of the first call and a second call parameter specifying a file identifier of the first call;
   determining an execution priority associated with the first call based on the two or more parameters;
   storing information about the first call, the parameters, and the execution priority to a database, wherein the stored information is combined with a data block associated with a second call of a plurality of calls stored in the database into a set of call data blocks, wherein call parameters of the second call specifying a type of operation of the second call and a file identifier of the second call are the same as at least two of the parameters of the first call, each call data block including a respective call, parameters of the respective call, and execution priority of the respective call;
   selecting, from the database, one or more calls for execution based at least in part on relative priorities of execution of the plurality of calls stored in the database;
   determining whether to execute or not to execute a selected call based on whether the selected call interferes with execution of an earlier selected call having a same file identifier as the selected call, wherein the earlier selected call is from a process of an antivirus application and has a higher relative execution priority;

responsive to determining that the selected call does not interfere with execution of the earlier selected call, passing the selected call to the file system for execution; and responsive to determining that the selected call does interfere with execution of the earlier selected call, sending the selected call to a caching module.

2. The method of claim 1, wherein intercepting, by the software agent, the first call to the file system includes intercepting a call from the process of the antivirus application to the file system.

3. The method of claim 1, wherein the software agent includes a driver configured to detect calls to the file system and modify the detected calls to be redirected to the driver.

4. The method of claim 1, wherein the two or more parameters include: an identifier of the process that made the call, attributes of a file, parameters of data contained in the file, and security policies for accessing the file.

5. The method of claim 1, wherein selecting from the database, one or more calls for execution based at least in part on relative priorities of execution of the plurality of calls stored in the database includes one or more of:

selecting a call with a specified priority;

selecting a call with a higher priority over all other calls in the database;

selecting a call having lower priority than a call that was sent for execution earlier;

selecting a call having higher priority than a call that was sent for execution earlier; or selecting two or more calls having the same priority of execution provided that the total number of such calls exceeds a threshold.

6. The method of claim 1, wherein determining whether to execute the selected call based on whether the selected call interferes with execution of the earlier selected call includes:

determining whether the selected call has at least one parameter in common with an earlier selected call that still being executed.

7. The method of claim 1, wherein determining whether the selected call interferes with execution of the earlier selected call further comprising:

determining that the selected call does not interfere with execution of the earlier selected call responsive to determining that a call parameter of the selected call and a call parameter of the earlier selected call both include a call type specifying a read operation is to be executed on a file associated with the same file identifier.

8. The method of claim 1, wherein determining whether the selected call interferes with execution of the earlier selected call further comprises:

determining that the selected call does not interfere with execution of the earlier selected call responsive to determining that no call parameters associated with the selected call are equal to any call parameters associated with the earlier selected call.

9. A system for executing calls to a file system of a computer, the system comprising:

a hardware processor configured to:

execute a software agent operable to intercept a first call to the file system;

determine two or more parameters of the first call that identify at least one functionality of the call, the two or more parameters comprising a first call parameter specifying a type of operation of the first call and a second call parameter specifying a file identifier of the first call;

determine an execution priority associated with the first call based on the two or more parameters;

store information about the first call, the parameters, and the execution priority to a database, wherein the stored information is combined with a data block associated with a second call of a plurality of calls stored in the database into a set of call data blocks, wherein call parameters of the second call specifying a type of operation of the second call and a file identifier of the second call are the same as at least two of the parameters of the first call, each call data block including a respective call, parameters of the respective call, and execution priority of the respective call;

select from the database, one or more calls for execution based at least in part on relative priorities of execution of the plurality of calls stored in the database;

determine whether to execute or not to execute a selected call based on whether the selected call interferes with execution of an earlier selected call having a same file identifier as the selected call, wherein the earlier selected call is from a process of an antivirus application and has a higher relative execution priority;

responsive to determining that the selected call does not interfere with execution of the earlier selected call, pass the selected call to the file system for execution; and responsive to determining that the selected call does interfere with execution of the earlier selected call, send the selected call to a caching module.

10. The system of claim 9, wherein the software agent is operable to intercept a call from the process of the antivirus application to the file system.

11. The system of claim 9, wherein the software agent includes a driver configured to detect calls to the file system and modify the detected calls to be redirected to the driver.

12. The system of claim 9, wherein the two or more parameters include: an identifier of the process that made the call, attributes of a file, parameters of data contained in the file, and security policies for accessing the file.

13. The system of claim 9, wherein, to select from the database, one or more calls for execution based at least in part on relative priorities of execution of the plurality of calls stored in the database, the hardware processor is configured to perform one or more of:

selecting a call with a specified priority;

selecting a call with a higher priority over all other calls in the database;

selecting a call having lower priority than a call that was sent for execution earlier;

selecting a call having higher priority than a call that was sent for execution earlier; or selecting two or more calls having the same priority of execution provided that the total number of such calls exceeds a threshold.

14. The system of claim 9, wherein, to determine whether to execute the selected call based on whether the selected call interferes with execution of the earlier selected call, the hardware processor is configured to perform:

determining whether the selected call has at least one parameter in common with an earlier selected call that still being executed.

15. A non-transitory computer readable medium storing computer executable instructions for executing calls to a file system of a computer, including instructions for:
- intercepting, by a software agent executed by a processor, a first call to the file system;
- determining two or more parameters of the first call that identify functionality of the call, the two or more parameters comprising a first call parameter specifying a type of operation of the first call and a second call parameter specifying a file identifier of the first call;
- determining an execution priority associated with the first call based on the two or more parameters;
- storing information about the first call, the parameters, and the execution priority to a database, wherein the stored information is combined with a data block associated with a second call of a plurality of calls stored in the database into a set of call data blocks, wherein call parameters of the second call specifying a type of operation of the second call and a file identifier of the second call are the same as at least two of the parameters of the first call, each call data block including a respective call, parameters of the respective call, and execution priority of the respective call;
- selecting, from the database, one or more calls for execution based at least in part on relative priorities of execution of the plurality of calls stored in the database;
- determining whether to execute or not to execute a selected call based on whether the selected call interferes with execution of an earlier selected call having a same file identifier as the selected call, wherein the earlier selected call is from a process of an antivirus application and has a higher relative execution priority;
- responsive to determining that the selected call does not interfere with execution of the earlier selected call, passing the selected call to the file system for execution; and
- responsive to determining that the selected call does interfere with execution of the earlier selected call, sending the selected call to a caching module.

16. The non-transitory computer readable medium of claim 15, wherein intercepting, by a software agent, a call to the file system includes intercepting a call from the process of the antivirus application to the file system.

17. The non-transitory computer readable medium of claim 15, wherein the software agent includes a driver configured to detect calls to the file system and modify the detected calls to be redirected to the driver.

18. The non-transitory computer readable medium of claim 15, wherein the two or more parameters include: an identifier of the process that made the call, attributes of a file, parameters of data contained in the file, and security policies for accessing the file.

19. The non-transitory computer readable medium of claim 15, wherein the instructions for selecting from the database, one or more calls for execution based at least in part on relative priorities of execution of the plurality of calls stored in the database comprises instructions for one or more of:
- selecting a call with a specified priority;
- selecting a call with a higher priority over all other calls in the database;
- selecting a call having lower priority than a call that was sent for execution earlier;
- selecting a call having higher priority than a call that was sent for execution earlier; or
- selecting two or more calls having the same priority of execution provided that the total number of such calls exceeds a threshold.

20. The non-transitory computer readable medium of claim 15, wherein the instructions for determining whether to execute the selected call based on whether the selected call interferes with execution of the earlier selected call comprise instructions for:
- determining whether the selected call has at least one parameter in common with an earlier selected call that still being executed.

* * * * *